July 7, 1931.            R. BELLO            1,813,603
CUSHION TIRE FOR VEHICLES
Filed April 29, 1930
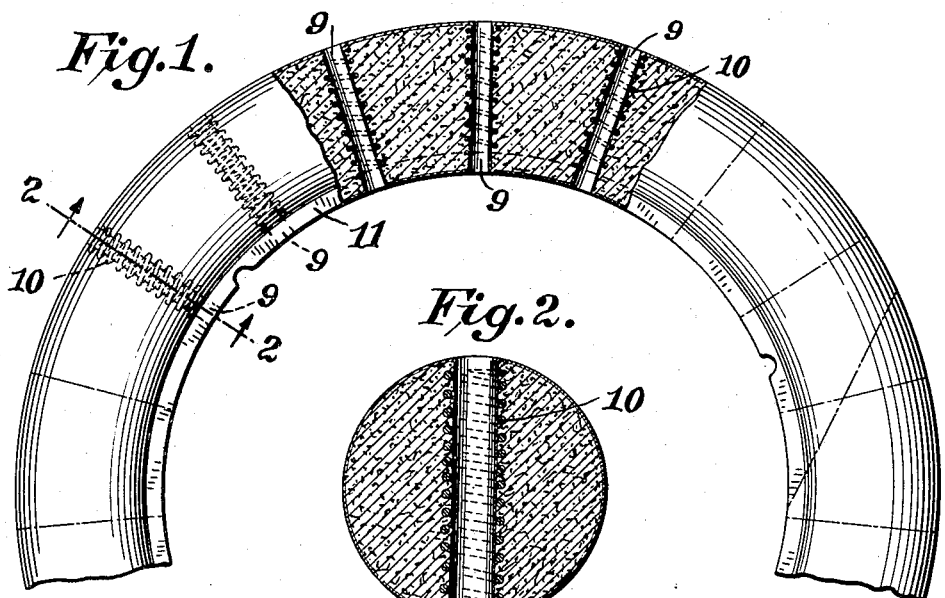
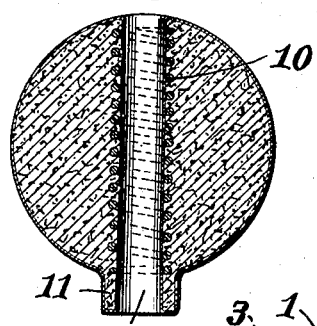
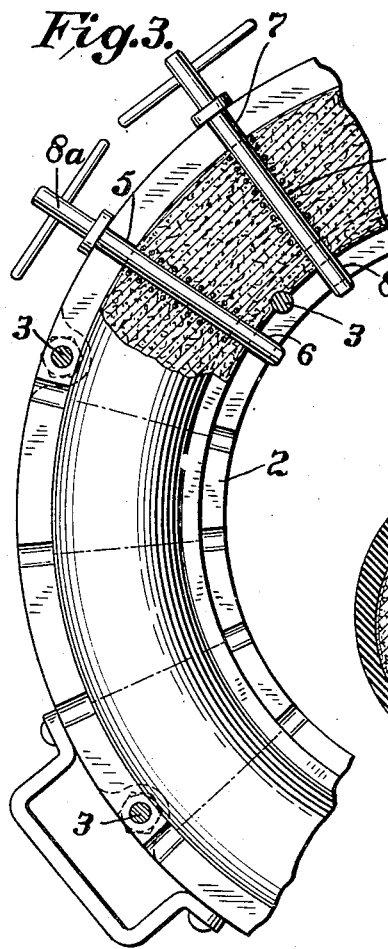
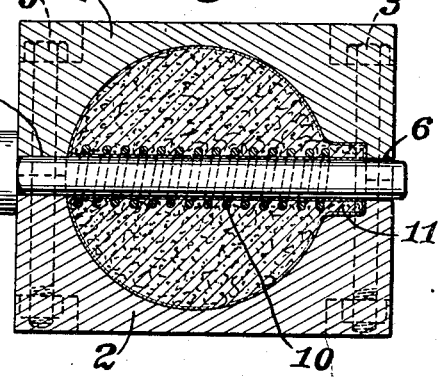
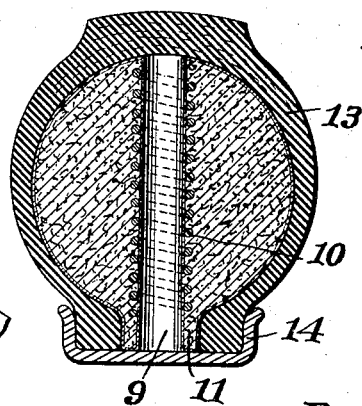
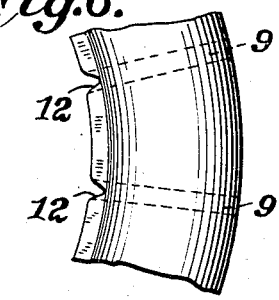
Inventor:
Rosario Bello,
By Parker & Curl
Atty.

Patented July 7, 1931

1,813,603

UNITED STATES PATENT OFFICE

ROSARIO BELLO, OF NEW YORK, N. Y.

CUSHION TIRE FOR VEHICLES

Application filed April 29, 1930. Serial No. 448,313.

My invention relates to new and useful improvements in cushion tires for vehicles, and the present application is a companion to the one filed by me on the 13th day of March, 1929, Serial No. 346,726. In the present application, I have shown a plurality of springs inserted in a solid sponge rubber core and I have means for preventing any creeping or lateral shifting of the core when placed within the outer shoe.

An object of the invention is to form a cushion tire comprising a core of sponge rubber in which there are a plurality of circumferentially arranged, radially extending springs which, in turn, are placed within radial passageways, after which the sponge rubber is molded, so that the springs will be held in proper position when the core is finished.

Still another object of the invention is to provide a core of sponge rubber which is circular in cross section, with the exception that around the inner periphery there is molded a reinforcing rib or band of sponge rubber, so that when the inner edges of the tire shoe or casing are clamped in position on the rim, this additional band or rim of sponge rubber will prevent any creeping or lateral shifting of the core in the casing, so that the springs, in turn, will always remain in a true central radial position.

Still another object of the invention is to provide a tire of the cushion type wherein the springs will have a compression strength, about equal to the compression strength of the sponge rubber core, so that the springs will thereby take up any heavy load that is placed upon the tire.

Still another object of the invention is to provide a core of sponge rubber having an inner peripheral rib which not only prevents a shifting of a core in a shoe, but which also strengthens the core as a whole.

Still another object of the invention is to provide slight cut-away portions at the sides of the reinforcing rib directly opposite the holes, in which are inserted the springs, so that as the tire is compressed, the inner peripheral strengthening band is allowed to stretch or give between the respective cut-out portions, because as the tire flattens, the distance between the cut-out portions is naturally lengthened.

With these and other objects in view, the invention consists in certain new and novel arrangements and combinations of parts, as will be hereinafter more fully described and pointed out in the claims.

Referring to the drawings,

Fig. 1 is a side elevation of a portion of a tire filler or core, a part being shown in section;

Fig. 2 is an enlarged cross sectional view taken on the line 2—2 of Fig. 1;

Fig 3 is a plan view of a portion of the tire mold showing the filler or core therein and several of the spring centering pins in position;

Fig. 4 is a cross section of a mold with a core therein;

Fig. 5 is a cross section of the complete tire with the core and outer casing mounted on the felly or wheel rim; and Fig. 6 is a fragmentary view showing a slight modification wherein the inner peripheral strengthening rib is slighly cut away at points opposite the spring openings, so that the rib may stretch between the joints without cracking.

Referring now more particularly to the drawings, and for the moment to Fig. 3, there is shown, partly in elevation and partly in section, a fragmentary portion of a metal mold comprising the halves 1 and 2, which halves are held in place by the bolts 3. These halves of the mold are provided with a plurality of circumferentially spaced aligned openings, such as 5, 6, 7 and 8, so that when the parts of the mold are fastened together, aligning pins $8^a$ may be properly placed within the mold to hold the springs, to be shortly mentioned.

To form the core or cushion, I preferably take a long strip of sponge rubber, cylindrical in form, and provide a plurality of openings, such as 9, the space between the openings being equal to the distance between the openings in the metal mold. I then place a spring 10 on each of the aligning pins 8ᵃ and push the pins and spring down through the respective openings 9, as it will be remembered that the sponge rubber at this stage is only partly vulcanized and relatively soft. After I have placed the springs and aligning pins in the openings in the core, the long cylindrical strip is cut to the proper length (preferably diagonally), and placed within one-half of the metal mold, so that the ends meet, after which the other half is placed thereover and the mold clamped tightly together by the several bolts 3.

It may be stated that the diameter of the metal mold is slightly less than the diameter of the cylindrical rubber core, so that the said rubber core will be forced around its inner periphery into the shape of a strengthening band or rib 11, as may be readily seen in Fig. 4. After the halves of the mold have been locked, the sponge rubber is then further cured or molded with the aligning pins in place, after which it is cooled in the regular manner.

The mold will then be opened and the aligning pins withdrawn, the several springs being properly embedded in their true radial position.

The springs preferably have a compression strength of about thirty-five pounds, which is also the desired compression strength of the sponge rubber, so that the core will not collapse when on the ground, especially under heavy load.

By shaping the mold as shown, there is formed the inner peripheral strengthening rib or band 11, which, when clamped in the shoe or casing, will prevent any shifting either laterally or circumferentially of the outer casing and, at the same time, will tend to strengthen the core as a whole. It will be understood that the openings 9 in the core also pass directly through this inner rib 11.

In the slightly modified form shown in Fig. 6, it will be seen that I cut away a slight portion of the rib on its sides, as at 12, or, in other words, just opposite the openings 9 in the sides of the rib, so that as the tread engages the ground, the rib or rim 11 may stretch or give between these openings 12 and not tear or crack at these points as, of course, the distance between the two points is lengthened when the tire flattens out on the bottom, due to the weight of the load.

After the core has been molded, as above described, it may be put within the casing or tread 13, and after the rim 14 is in position it binds the inner adjacent ends of the shoe or casing tightly about the strengthening rib 11, thus holding the core properly in position and preventing the same from shifting either laterally or circumferentially. This is desirable, of course, as the spring should always be in proper radial alignment.

From the foregoing, it will be seen that I have provided a cushion tire consisting of a solid rubber core, in which there are a plurality of radial openings passing completely through the core, and within these openings are the properly aligned respective springs, the bore of the openings being co-axial with the bore of the coil springs.

By providing these openings, it is possible to have the springs placed on the aligning pins when the core is being molded, so there is no danger of these springs getting out of axial alignment with the holes during the molding of the core.

Finally, there is provided an inner peripheral strengthening rib to avoid any creeping of the core within the casing and to provide against any lateral shifting of the core within the casing.

I am aware that it is old to embed springs in a solid rubber core, but I am not aware of a core or filler formed with a plurality of openings to receive aligning pins, which pins, in turn, hold the springs in position when the tire is being molded, nor am I aware of a sponge rubber core having a strengthening rib around its inner peripheral surface which, in turn, is to be clamped between the inner adjacent edges of the common form of tire casings now in use.

Many slight changes might be made without in any way departing from the spirit and scope of the invention.

Having thus described my invention, what I claim as new and desire to secure by Letters Patent is:

1. A core for a tire casing, said core formed of sponge rubber and provided with a series of radial openings extending therethrough, an inner peripheral integral rib, said openings extending through said rib, and coil springs embedded within the tire core and terminating short of the opposite ends of their respective openings and the axis of the springs registering co-axial with the bore of the openings.

2. A unitary tire core formed of sponge rubber, a plurality of radially disposed coil springs, an inner peripheral strengthening rib, said core provided with a plurality of radially disposed openings, the axes of the springs registering with the said respective openings, said openings also passing through the strengthening rib, and the side walls of the rib being cut away opposite the said openings to allow for a flattening of the core at the tread without stretching the rib beyond the tearing point.

3. A circular core for a cushion tire formed of sponge rubber, said core having radial passageways extending completely therethrough, an inner integral peripheral strengthening rib and the said passageways extending through said rib, coil springs embedded centrally of the core and having the axes of the springs co-axial with the bore of the passageways, the springs being shorter in length than the cross-sectional diameter of the tire core, and the compressibility in pounds of the springs equal to the compressibility in pounds to the sponge rubber of the core.

In testimony whereof I affix my signature.

ROSARIO BELLO.